(12) United States Patent
Schibi

(10) Patent No.: US 6,910,023 B1
(45) Date of Patent: Jun. 21, 2005

(54) METHOD OF CONDUCTING SECURE TRANSACTIONS CONTAINING CONFIDENTIAL, FINANCIAL, PAYMENT, CREDIT, OR OTHER INFORMATION OVER A NETWORK

(76) Inventor: Eitan Schibi, 1771 Avenue Road, P.O. Box 54613, Toronto, Ontario (CA), M5M 4N5

( * ) Notice: Subject to any disclaimer, the term of this patent is extended or adjusted under 35 U.S.C. 154(b) by 0 days.

(21) Appl. No.: 09/578,708

(22) Filed: May 26, 2000

(51) Int. Cl.$^7$ .............................................. G06F 17/60
(52) U.S. Cl. ........................................ 705/64; 705/39
(58) Field of Search ............................. 705/64, 79, 72, 705/39, 65, 75, 66–71, 73, 74, 76–78, 26, 44, 38, 40

(56) References Cited

U.S. PATENT DOCUMENTS

| | | | | |
|---|---|---|---|---|
| 5,899,980 A | * | 5/1999 | Wilf et al. | 705/26 |
| 6,016,484 A | * | 1/2000 | Williams et al. | 295/44 |
| 6,047,268 A | * | 4/2000 | Bartoli et al. | 705/35 |
| 6,076,078 A | * | 6/2000 | Camp et al. | 380/268 |
| 6,267,292 B1 | * | 7/2001 | Walker et al. | 235/379 |
| 6,324,526 B1 | * | 11/2001 | D'Agostino | 235/375 |
| 6,327,578 B1 | * | 12/2001 | Linehan | 705/65 |
| 6,332,134 B1 | * | 12/2001 | Foster | 705/36 |

* cited by examiner

Primary Examiner—Pierre E. Elisca
(74) Attorney, Agent, or Firm—Merek, Blackmon & Voorhees, LLC

(57) ABSTRACT

A method for enabling an individual, business, or other entity to exchange confidential information or to make purchases or conduct financial or other transactions over a public or quasi-public network while limiting the transmission of confidential, sensitive, financial or other information over the public or quasi-public network and limiting access to such information by unauthorized individuals. The method includes storing confidential, sensitive, financial or other information on a processing computer connected to the computer system or systems of one or more businesses or financial or other institutions by way of a private, non-public network. A first electronic message is sent from a first computer to a central network computer through transmission over the public or quasi-public network. At least a portion of the first electronic message received by the central network computer is stored on data storage or data transfer media. The data storage or data transfer media is then disconnected from the central network computer and connected to the processing computer. The processing computer reads the portion of the first electronic message stored on the data storage or data transfer media, identifies the source of the first electronic message, and accesses stored information concerning the source. Information from the first electronic message, and stored information concerning its source, can then be transmitted over the private, non-public network to the computer system or systems of one or more businesses, financial institutions, or other entities for processing.

16 Claims, 4 Drawing Sheets

Customer Order Confirmation

- Notification of Internet purchase from merchant xxxxxxxx

- Amount: $xxx.xx
- Date: xx-xxx-xxxx
- Shipping address:
    xxx xxxxxx xxx
    xxxxxxxxxx, xx
    xxxxx xx
- Transaction number: xxxxxxx

- Terms & conditions:
    ...
    ...
    ...

[Approve]    [Reject]

Figure 4

Customer Order Confirmation

- Notification of Internet purchase from merchant xxxxxxxx

- Amount: $xxx.xx
- Date: xx-xxx-xxxx
- Shipping address:
  xxx xxxxxx xxx
  xxxxxxxxxx, xx
  xxxxx xx
- Transaction number: xxxxxxx
- Terms & conditions:
  ...
  ...
  ...

[Approve]  [Reject]

METHOD OF CONDUCTING SECURE TRANSACTIONS CONTAINING CONFIDENTIAL, FINANCIAL, PAYMENT, CREDIT, OR OTHER INFORMATION OVER A NETWORK

FIELD OF THE INVENTION

This invention relates generally to methods of exchanging any type of confidential information over a network, including conducting electronic commerce and financial transactions over a network. One embodiment of the invention relates to a method of credit card payment and financial transaction processing over a public or quasi-public network.

BACKGROUND OF THE INVENTION

Over the span of a few short years the Internet has gone from a highly specialized quasi-public computer network used by a relatively narrow group of individuals and institutions, to a broadly based worldwide web that touches upon the daily lives of hundreds of millions, if not billions, of individuals, businesses and other entities across the globe. The explosive growth of the Internet has brought with it an equally expansive growth of its use for exchanging and sharing information, providing services and conducting commercial or business transactions. Business transactions conducted over the Internet, generally referred to as "e-commerce", provides individuals across the world with the ability to shop for a wide variety of goods and services, offered by countless different businesses and commercial operations, merely through the use of a personal computer connected to the Internet by way of a standard modem. Many have predicted that in the foreseeable future the volume and dollar value of merchandise purchased through e-commerce will rival or exceed what is purchased through more traditional methods.

Unfortunately, with the rapid advancement of the Internet and its use by more and more individuals, businesses and other entities there has also been a significant increase in the incidence of invasion of privacy, identity theft, fraud and financial theft by unscrupulous individuals. Since by the very nature of e-commerce transactions the parties, or the buyer and seller, rarely meet face to face, much of the merchandise purchased over the Internet is paid for by consumers through the use of credit cards or debit cards. Typically a consumer places an order for merchandise over the Internet and provides the merchant with details concerning his or her credit card (or in some cases debit card) so that the merchant may process payment for the goods prior to their shipment. Companies who engage in electronic commerce often incorporate elaborate security, firewall and encryption systems in order to help safeguard sensitive or confidential financial information sent and received over the Internet. However, even with such safeguards in place confidential financial or other information is often vulnerable to access by unauthorized parties who are able to break through security barriers, firewalls or encryption systems. As a result, the security of credit, financial and other sensitive or confidential information that may be provided over the Internet, and its potential theft or fraudulent use, is a growing concern to consumers, merchants and financial institutions alike. Aside from elaborate security and encryption systems, in most cases the only alternative available to a consumer and a merchant that provides for the security of the consumer's credit information is for the consumer to forward payment by means of a cheque or money order directly to the merchant. However, that alternative is often either undesirable or impractical, due to the administrative inconvenience and delay associated with having to forward payment through other channels for manual processing prior to shipment of the goods or merchandise.

SUMMARY OF THE INVENTION

The invention therefore provides a method that enables individuals, businesses and other entities to exchange confidential information or make purchases or conduct financial or other secure transactions or exchange information over a quasi-public network, such as the Internet, without the fear of having sensitive or confidential information stored in a location or through a procedure that may make it vulnerable to access by unauthorized parties by way of the quasi-public network.

Accordingly, in one of its aspects the invention provides a method for enabling an individual, business, or other entity to exchange confidential information or to make purchases or conduct financial or other transactions over a public or quasi-public network while limiting the transmission of confidential, sensitive, financial or other information over the public or quasi-public network and limiting access to such information by unauthorized individuals, the method comprising the steps of; on a processing computer or electronic data storage means, storing confidential, sensitive, financial or other information for which restricted access is desired, said information concerning one or more individuals, businesses or other entities, said processing computer or electronic data storage means connected to the computer system or systems of one or more businesses, financial institutions or other entities by way of a private, non-public network; sending a first electronic message from a first computer or computing means to a central network computer through transmitting said first electronic message over a public or quasi-public network, said first computer and said central network computer each connected to the public or quasi-public network, said first electronic message including information identifying the individual, business or entity from whom the message originated and including commercial, financial, or other information; storing at least a portion of said first electronic message received by said central network computer on data storage or transfer media connected to said central network computer; thereafter, disconnecting said data storage or transfer media from said central network computer and connecting said data storage or transfer media to said processing computer; with said processing computer, reading the portion of said first electronic message stored on said data storage or transfer media, identifying the individual, business or other entity from whom said first electronic message originated, and accessing said stored confidential, sensitive, financial or other information concerning said individual, business or other entity as stored on said processing computer; and, from said processing computer, transmitting information from said first electronic message, together with the identity of the individual, business or other entity from whom said first electronic message originated and said confidential, sensitive, financial or other information concerning said individual, business or other entity, to the computer system or systems of said one or more businesses, financial institutions, or other entities for processing.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

The present invention may be embodied in a number of different forms and may be used in a number of different applications (for example, to obtain confidential medical information, such as medical test results, from medical institutions and medical laboratories; to obtain confidential evaluation information, such as performance appraisals or report cards, from employers, or educational and training institutions; and numerous other applications). However, the specification and drawings that follow describe and disclose only a few of the specific forms of the invention and are not intended to limit the scope of the invention as defined in the claims that follow herein.

Figure 1:
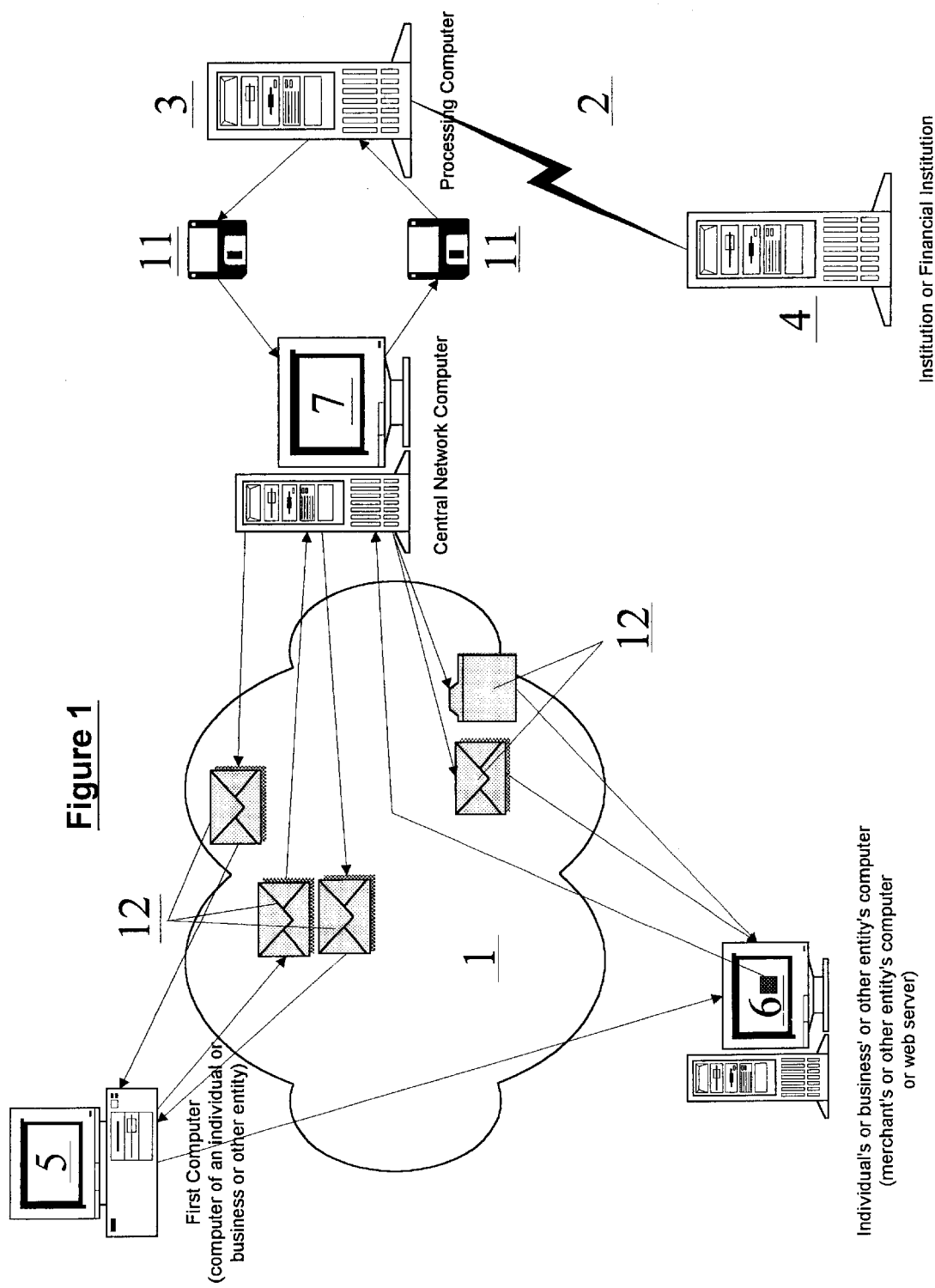
FIG. 1 is a schematic representation of the primary aspects of the method of the present invention.

The method of the present invention operates through the use of two separate and distinct computer networks; namely, a quasi-public or public network and a private, non-public network. In FIG. 1 these two networks are noted graphically by reference numerals 1 and 2, respectively. While in most instances it is expected that the quasi-public or public network will comprise the Internet, it will be appreciated from a thorough understanding of the invention that other public and quasi-public networks (for example interactive television or cable networks) may also be utilized while staying in the broad scope of the invention.

An important feature of the invention is the fact that individual computers accessing one of the two networks that are involved do not have direct access to the other network. That is, computers or other electronic devices connected to the Internet do not have direct access to the private, non-public network, and vice versa. The separation of the two computer networks, and the isolation of data stored and accessible on each individual network, is but one of the mechanisms by which the method of the present invention maintains the confidentiality of sensitive information.

Central to the private, non-public network 2 of the present invention is a processing computer 3. Processing computer 3 would typically store confidential, sensitive, financial or other information of individuals, businesses or other entities using the method, where restricted access to such information is desired. It is expected that one of the applications of the invention will be to assist and enable businesses, individuals and other entities to make purchases or conduct secure financial or other transactions over the Internet. Of these transactions, those generally referred to as e-commerce are likely to comprise a large application for the invention and represent a particular application where the sensitivity of financial information is critical.

For the processing of e-commerce transactions, in the preferred embodiment processing computer 3 is connected by way of private, non-public network 2 to the computer system or systems 4 of one or more financial institutions. Since processing computer 3 and the computer systems of various institutions or financial institutions are connected or linked by way of a private network, information stored on the systems or transmitted between such computers is secure from unscrupulous individuals having access to the Internet. That is, unauthorized individuals or "hackers" are provided with no access to either the private network or the computers thereon, preventing the fraudulent or criminal acquisition and use of sensitive and confidential information.

In FIG. 1 there is further shown a graphical representation of a typical configuration of computers as they may be linked together in order to make purchases, conduct financial or other transactions, or exchange information over the Internet. In this Figure, the computer of an individual, business or other entity connected to the Internet is identified generally by reference numeral 5. Through accessing the Internet by means of a standard modem or other electronic connection means, an individual, business or other entity's computer 5 has the ability to be linked to, or communicate with, a merchant's computer or web server 6, as well as a central network computer 7.

In order the utilize the method of the present invention, an individual, business or other entity must first "register" with processing server 3. In these regards registration comprises the provision of information from an individual, business or other entity, which information may include details concerning names, addresses, confidential information, credit or financial information and/or other information for storage on processing computer 3. For a financial or purchase transaction, typically such information would include information such as an address or addresses to which merchandise purchased over the Internet would be shipped; credit card details including card numbers, issuing authorities, and expiry dates; debit card information; etc. Other applications of this inventive method, for example in the medical, employment, educational or other fields, would include information and details relevant to the particular application in question.

Upon the registration of an individual, business or other entity and the provision of such information for storage on processing computer 3, the individual, business or other entity is preferably provided with a password or personal identification number (i.e. PIN) and a security code corresponding, in a financial or commercial application, to each of the particular credit card, debit card, bank account or other account numbers that the individual, business or other entity has provided for storage on processing computer 3. In other applications, a password or personal identification number and security code corresponding to different application requests would be provided. Merchants and other businesses or entities wishing to engage in e-commerce or the electronic exchange of information are also "registered" on processing computer 3 in order to allow for the proper receipt of information or the proper crediting of payment when goods are purchased. Typically merchants and other entities who register under the system will be provided with their own unique merchant or entity identification number.

Through employment of the present method there will be no need or obligation for an individual or other entity to provide confidential financial information or addresses over the Internet or other public or quasi-public network when making purchases, conducting e-commerce or other transactions, or exchanging confidential or other information. Similarly, confidential, sensitive, financial or other information concerning merchants or other entities that have "registered" (for example bank accounts, merchant credit card numbers, etc.) are stored solely upon processing computer 3 and for that reason are isolated from the Internet or other public or quasi-public network. As is set out in more detail below, through employment of the inventive method credit card numbers and other financial sensitive, or confidential details relating to a customer or business do not travel across the Internet or other public or quasi-public network, nor is such information stored upon any computers of merchants or other servers connected to the Internet or other public or quasi-public network. Further, individual merchants or other entities do not have direct access to, and are not provided with, individual credit card numbers or other sensitive or confidential information.

Further aspects of the steps involved in the method of the present invention may best be described and understood by way of an example of the method in use. The example that follows is one in the area of e-commerce purchases by a credit card, however, it will be appreciated that there are many other applications of the inventive method for use in other situations.

An individual, business or other entity who has "registered" under the secure system described herein, and who wishes to make a purchase or conduct a financial transaction over the Internet or other public or quasi-public network, begins by first accessing the Internet or other public or quasi-public network from computer 5 and sending a first electronic message over the Internet or other public or quasi-public network. The first electronic message may be sent directly from computer 5 to central network computer 7 or, where an individual wishes to make a purchase over the Internet or other public or quasi-public network, the first electronic message may be sent to central network computer 7 by way of an Internet link on the computer system of a merchant computer or web server 6. Where an individual, business or other entity wishes to purchase goods over the Internet or other public or quasi-public network the individual, business or other entity will typically first access the computer of a particular merchant and begin looking for specific items. Methods of conducting e-commerce and purchasing goods in this manner are widely known and commonly employed over the Internet on a daily basis. Such transactions are generally referred to as on-line purchases.

When purchasing goods over the Internet or other public or quasi-public network individuals, businesses and other entities must often scroll through numerous display screens on their computers to view a variety of details concerning particular goods being offered for sale by a merchant. The purchaser may identify a number of different goods for purchasing and would typically place such goods within a virtual "shopping cart" on the merchant's website. When all the desired goods have been identified, under presently operating e-commerce systems the purchaser then "checks out" the goods in the shopping cart through inputting his or her name and address, and a method of payment. In some cases the method of payment is by credit card and the credit card number and expiry date are input through computer 5 and transmitted via the Internet or other public or quasi-public network to merchant computer 6.

Figure 2:
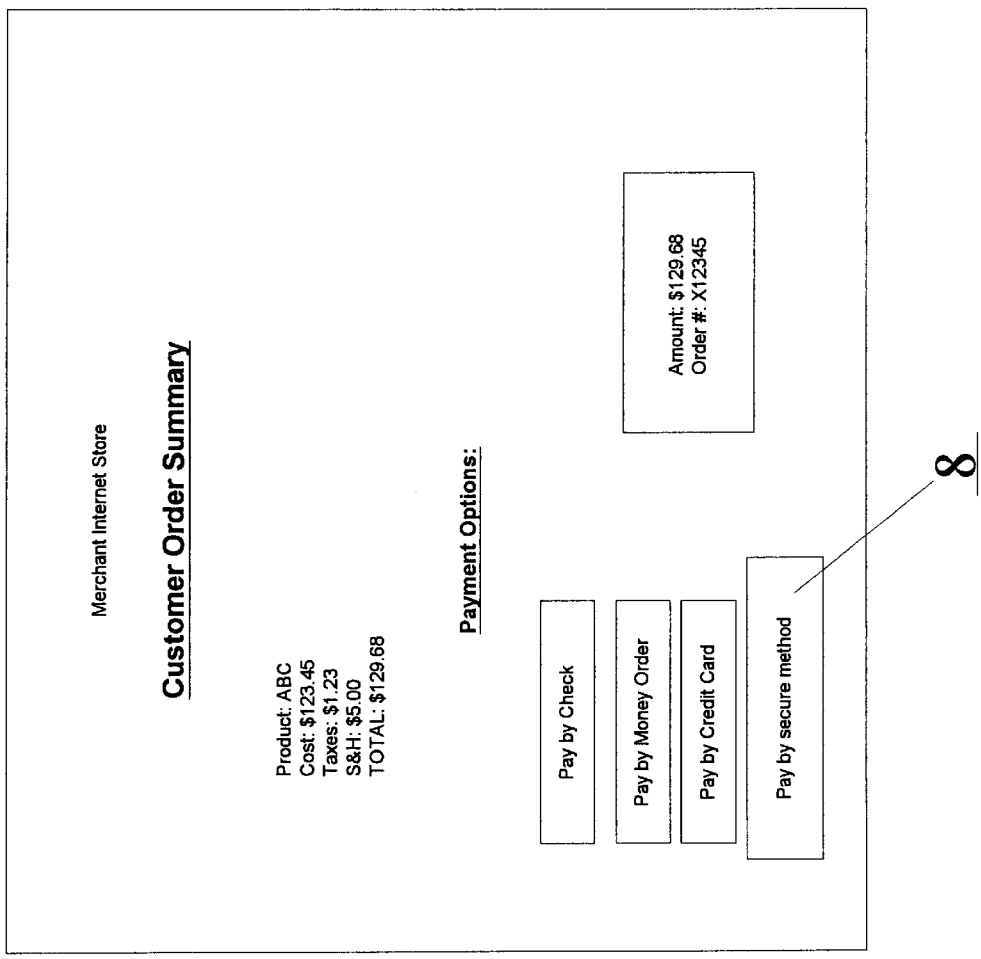
FIG. 2 is a representation of a customer order summary such as may be displayed upon the monitor of a computer used pursuant to the method of the present invention.

According to the present invention, in addition to the standard options available for payment the merchant's website provides a further option allowing for secure payment through the use of the inventive method described herein. A typical representation of a customer order summary showing the various payment options as may be found on a merchant website is shown in FIG. 2. In FIG. 2 there is depicted an example of a display screen that may be presented to a purchaser on computer 5 while making a purchase over the Internet or other public or quasi-public network. Such a display screen may include a summary of the customer's order, including total charges for goods purchased, taxes and any delivery charges, together with a series of payment options. To access the current method the purchaser simply chooses the particular option associated with the secure payment method (identified in FIG. 2 by box 8). In most instances this would be accomplished through the utilization of a mouse and clicking on box 8.

Figure 3:
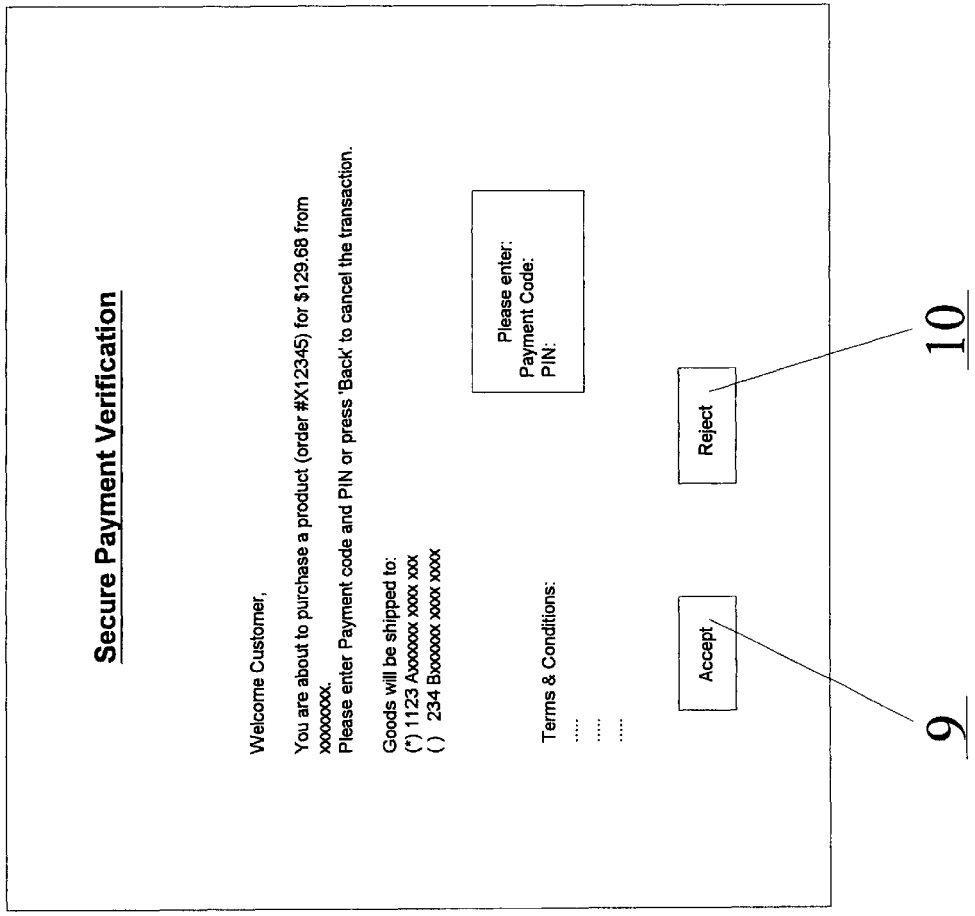
FIG. 3 is a representation of a secure payment verification such as may be displayed upon the monitor of a computer used pursuant to the method of the present invention; and, FIG. 4 is a representation of a customer order confirmation such as may be displayed upon the monitor of a computer used pursuant to the method of the present invention.

In the preferred embodiment once an individual purchaser chooses to proceed with payment under the present invention, computer 5 is then linked to central network computer 7 and is presented with a display screen resembling that as represented in FIG. 3. At that point the individual is prompted to enter his or her password or personal identification number and security code corresponding to a particular credit card, debit card, deposit account or other account which the individual has previously registered. While linked to central network computer 7 via the Internet or other public or quasi-public network, the identity of the merchant from whom the individual wishes to purchase goods, and the total amount of the purchase including taxes and delivery, is also downloaded to the central network computer. For security purposes the individual's personal identification number and payment code are not displayed on any computer monitor screens. Once the appropriate data has been entered the individual will be prompted to either accept or reject the transaction by selecting the appropriate box on the computer screen (9 or 10 as shown in FIG. 3). If the transaction is accepted, a confirmation request is sent to the individual to confirm the authenticity and accuracy of the purchase request. Once the individual confirms the purchase request, the central network computer 7 prepares the data for transference to processing computer 3. The data in these regards will include the individual's personal identification number, payment code, information concerning the identity of the merchant, and the total purchase price for the transaction.

Referring again to FIG. 1, the transference of the pertinent data from central network 7 to processing computer 3 comprises first storing the data upon data storage or data transfer media 11 connected to the central network computer. It will be appreciated by those skilled in the art that the particular form of data storage or data transfer media that is utilized may vary substantially while remaining within the broad scope of the invention. For example, storage or data transfer media 11 may comprise a standard computer disk, a re-writeable CD ROM, magnetic tape, a zip disk, or any other variety of magnetic, electronic or other storage media. Storage or data transfer media 11 may also include infra-red data transfer means. Depending upon the number of financial or other transactions processed by central network computer 7, and the frequency of the transactions, the data associated with one or more transactions may be stored on the same storage media device.

Periodically data storage or data transfer media 11 will be disconnected from central network computer 7 and thereafter connected to processing computer 3 so that data stored thereon may be read and processed by computer 3. It will also be appreciated by those skilled in the art that the frequency of transporting storage media 11 from central network computer 7 to processing computer 3 may vary and may be affected in part by the number of transactions processed by the central network computer and the frequency of those transactions. Once storage media 11 has been connected to processing computer 3 and the information thereon retrieved, processing computer 3 identifies the individual, business or other entity from whom the purchase request or enquiry originated. The personal identification number entered by the individual, business or other entity and transported to processing computer 3 allows the processing computer to identify the particular individual, business or other entity of concern, and to access stored confidential, sensitive or other information concerning such individual, business or other entity.

In a situation where goods are sought to be purchased over the Internet or other public or quasi-public network, the payment code entered by the individual, business or other entity, and subsequently transported to processing computer 3, permits the processing computer to identify the particular credit card, debit card, bank account or other account to which the individual, business or other entity wishes the purchase price of the merchandise to be charged. At that point, and with the above information available, the processing computer accesses the computer system 4 of one or more financial institutions to transmit information with respect to the identity of the individual, business or other entity and the merchant or other entity, the dollar value of the purchase that the individual, business or other entity wishes to make, and specific details with respect to the particular credit card, debit card or bank account which the individual, business or other entity wishes to use to pay for the merchandise. The financial institution's computer system is then able to process the information for payment of the order. If sufficient credit or funds are available to satisfy the purchase price of the merchandise, an electronic confirmation message is transmitted by way of private network 2 from computer 4 of the financial institution to processing computer 3. Preferably the transmission from the financial institution to the processing computer will include a credit authorization code, similar to the fashion by which merchants or other entities are provided with electronic authorization codes by credit card issuing authorities for standard credit card purchases.

Once the electronic confirmation message is received processing computer 3, the message can then be stored on data storage or data transfer media 11 with the storage media thereafter disconnected from processing computer 3 and transported for reconnection to central network computer 7. Upon connection of the data storage or data transfer media to central network computer 7, the electronic confirmation message on data storage or data transfer media 11 can be retrieved and transmitted to the individual's, business' or other entity's computer 5, and/or to the computer of merchants or other entities where there has been a request to purchase merchandise over the Internet or other public or quasi-public network. The electronic confirmation message transmitted in this fashion will notify both the individual, business or other entity and any merchants or other entities that the transaction has been completed and that payment for the goods has been authorized. The authorization of payment will also inform merchants that payment for the merchandise has been processed and that their respective accounts will be credited appropriately. It should be appreciated that while the transmission of electronic confirmation messages as described above can take place interactively over the quasi-public or public network, in many instances it is expected that confirmation reports or messages will be in the form of electronic mail, e-mail (identified graphically in FIG. 1 by reference numeral 12), file transfer protocol, or other methods of communicating.

A further aspect of the present invention that may be utilized when conducting e-commerce over the Internet or other public or quasi-public network involves limiting the ability of unauthorized individuals to access addresses of persons or businesses "registered" under the method. When providing confidential information for storage upon processing computer 3, an individual, business or other entity that desires to make purchases over the Internet or other public or quasi-public network may also provide a delivery address or addresses for merchandise that is so purchased. The delivery address or addresses are stored securely upon processing computer 3 and only transported to central network computer 7 when the processing of the order for merchandise has been completed and confirmed. In this respect when the electronic confirmation message is transported between processing computer 3 and central network computer 7 by way of data storage or data transfer media 11, there is also transported data with respect to the delivery address where merchandise for the particular individual, business or other entity placing the order is to be shipped. Once the data concerning the shipping address is received by central computer 7, that information can be forwarded electronically, together with the electronic confirmation message, to the merchant in question. The need for an individual, business or other entity placing an order for goods over the Internet or other public or quasi-public network to transmit a particular delivery address is thereby eliminated. Further, in a preferred embodiment of the invention the address is not permanently stored upon central processing computer 7, further limiting the potential for unauthorized individuals to gain access to addresses.

It will therefore be understood that the employment of the present invention provides a safe and secure means to conduct e-commerce over the Internet or other public or quasi-public network while limiting the ability of unauthorized individuals to gain access to sensitive or confidential information. In these regards credit card numbers, addresses, confidential, account, or other information does not travel across the quasi-public or public network, nor is it stored on data storage or data transfer devices or media that are accessible from the quasi-public or public network. Further, individual merchants are not directly provided with credit card numbers or other account information. Such information is stored on a separate processing computer linked to the computer systems of financial institutions through a private, non-public network. In addition, shipping addresses are pre-determined by consumers with purchased goods being sent to specific addresses that have been pre-registered. In situations where an individual, business or other entity has provided more than one address for storage on processing computer 3, during transactions or other exchanges of information that individual, business or other entity can select the particular address or addresses that are to be used in a particular transactions or exchange of information. This selection will be accomplished through the use of codes so that the full address is not obvious to unauthorized individuals and others. The only codes or identification numbers that are transmitted over the Internet or other public or quasi-public network are the particular passwords or PIN's and payment or security codes provided to individuals upon registration. Unlike credit card numbers, such codes have no application outside the present method. If intercepted by unauthorized individuals, these codes would be of no practical use.

The method of the present invention also provides a number of advantages to merchants offering goods or services over the Internet or other public or quasi-public network by removing the necessity for such businesses to invest, maintain and continually upgrade software and other security measures that would normally be required for the operation of online stores. Further, payment processing is simplified for merchants as they are not required to manage and maintain payment authorization or credit card information systems. The merchants are simply notified that the transaction has been completed and that the funds have been successfully credited to their account.

A further aspect of the present invention that may be utilized when conducting e-commerce over the Internet or other public or quasi-public network involves a rating facility that allows individuals, businesses or other entities to rate merchants based on their respective transactions and delivery of goods and services. Potential purchasers may then be permitted to view such ratings before engaging in e-commerce with particular merchants.

Finally, the method also provides for the ability to quickly integrate enhancements and added features that may be desirable to individuals and merchants alike. For example, reward programs could be set up. In addition, regular monthly debit charges for monthly accounts or invoices (for example alarm companies, newspaper delivery, etc) could be integrated into the system for automatic secure payment. In addition, to facilitate the transference of the data storage or data transfer media between the processing computer and the central network computer, and to enhance the speed of such transference, the use of automated machinery or robotics may be employed.

It is to be understood that what has been described are the preferred embodiments of the invention and that it may be possible to make variations to these embodiments while staying within the broad scope of the invention. Some of these variations have been discussed while others will be readily apparent to those skilled in the art.

I claim:

1. A method for enabling an individual, business, or other entity to exchange confidential information or to make purchases or conduct financial or other transactions over a public or quasi-public network while limiting the transmission of confidential, sensitive, financial or other information over the public or quasi-public network and limiting access to such information by unauthorized individuals, the method comprising the steps of:

(i) on a processing computer, storing confidential, sensitive, financial or other information for which restricted access is desired, said confidential, sensitive, financial or other information for which restricted access is desired concerning one or more individuals, businesses or other entities, said processing computer connected to a computer system or systems of one or more businesses, financial institutions or other entities by way of a private, non-public network;

(ii) sending a first electronic message from a first computer or computing means to a central network computer through transmitting said first electronic message over a public or quasi-public network, said first computer or computing means and said central network computer each connected to the public or quasi-public network, said first electronic message including information identifying the individual, business or entity from whom the message originated and including commercial, financial, or other information;

(iii) storing at least a portion of said first electronic message received by said central network computer on data storage or data transfer media connected to said central network computer;

(iv) thereafter, disconnecting said data storage or data transfer media from said central network computer and connecting said data storage or data transfer media to said processing computer;

(v) with said processing computer, reading the portion of said first electronic message stored on said data storage or data transfer media, identifying the individual, business or other entity from whom said first electronic message originated, and accessing said stored confidential, sensitive, financial or other information concerning said individual, business or other entity as stored on said processing computer;

(vi) from said processing computer, transmitting information from said first electronic message, together with the identity of the individual, business or other entity from whom said first electronic message originated and said confidential, sensitive, financial or other information concerning said individual, business or other entity, to the computer system or systems of said one or more businesses, financial institutions, or other entities for processing;

(vii) following processing of said information, said computer system or systems of said one or more businesses, financial institutions, or other entities transmitting a second electronic message to said processing computer acknowledging the receipt and processing of said information, said second electronic message comprising an electronic confirmation message; and, (viii) storing said second electronic message received by said processing computer on data storage or data transfer media, transporting said data storage or data transfer media from said processing computer to said central network computer, and transmitting said second electronic message from said central network computer over said public or quasi-public network to the computer system or systems of individuals, businesses or other entities with whom the originator of said first electronic message wishes to make purchases or conduct financial or other transactions.

2. The method as claimed in claim 1 wherein said first electronic message transmitted over said public or quasi-public network comprises an electronic purchase order to purchase merchandise or services over said public or quasi-public network, said information transmitted from said processing computer to the computer system of one or more financial institutions including credit card, debit card, account or other information with respect to the individual, business or other entity wishing to purchase merchandise or services over said public or quasi-public network and the monetary value of the desired purchase, said processing of said information by said computer system or systems of one or more businesses or financial institutions including authorizing the use of a credit card, debit card, account or other method of payment of said individual, business or other entity for said purchase, said second electronic message transmitted from the computer system or systems of one or more financial institutions to said processing computer including an authorization code acknowledging payment of said purchase by way of said credit card, debit card, account or other method of payment of said individual, business or other entity.

3. The method as claimed in claim 1 wherein said first electronic message transmitted over said public or quasi-public network comprises a request to transmit or exchange confidential information, said information transmitted from said processing computer to the computer system of the one or more institutions including confidential, sensitive or other information with respect to the individual, business or other entity wishing to exchange information.

4. The method as claimed in claim 1 including the further steps of storing said second electronic message received by said processing computer on data storage or data transfer media connected to said processing computer; disconnecting said data storage or data transfer media from said processing computer and connecting said data storage or data transfer media to said central network computer; and, transmitting said electronic confirmation message to said first computer over said public or quasi-public network.

5. The method as claimed in claim 1 wherein said transmission of said second electronic message to said first computer is by e-mail, by file transfer protocol or other communication means.

6. The method as claimed in claim 1 wherein said transmission of said second electronic message to said computer system or systems of individuals, businesses or other entities from whom the originator of said electronic message wishes to make purchases or conduct financial or other transactions is by e-mail, by file transfer protocol or other communication means.

7. The method as claimed in claim 1 wherein said public or quasi-public network is the Internet or an interactive television or cable network.

8. The method as claimed in claim 1 wherein said data storage or data transfer media comprises a computer disc, a compact disc, magnetic tape, zip disk, infra-red data transfer, or a magnetic storage device.

9. The method as claimed in claim 1 including the further steps of:
  (i) on said processing computer storing addresses or other information associated with the individuals, businesses or other entities for whom confidential, sensitive, financial or other information has also been stored on said processing computer;
  (ii) upon processing computer reading said first electronic message, or a portion thereof, said processing computer thereafter accessing the stored address or other information associated with the individual, business or other entity form whom said first electronic message originated;
  (iii) following receipt of said second electronic message by said processing computer storing the address or other information associated with the individual, business or other entity form whom said first electronic message originated on said data storage or data transfer media with said second electronic message such that the transportation of said data storage or data transfer media from said processing computer to said central network computer allows for the transmission of the address or other information associated with said individual, business or other entity over said public or quasi-public network to individuals, businesses or other entities with whom the originator of said first electronic message wishes to exchange information, or make purchases or conduct financial or other transactions.

10. The method as claimed in claim 1 wherein said confidential, sensitive, financial or other information stored on said processing computer includes credit card, debit card, account, banking or other payment information with respect to specific individuals, businesses or other entities wishing to make purchases or to conduct financial or other transactions over said public or quasi-public network.

11. The method as claimed in claim 1 wherein said first electronic message sent from said first computer to said central network computer includes a password specifically associated with a particular individual, business or other entity wishing to transmit or exchange information, or to make a purchase or to conduct financial or other transactions, over said public or quasi-public network.

12. The method as claimed in claim 1 wherein said first electronic message includes one or more security codes associated specifically with confidential information, or with a credit card, debit card, or account of said individual, business or other entity.

13. The method as claimed in claim 1 including the further step of accessing a merchant, institutional or other computer or web server over said public or quasi-public network with said first computer prior to the sending of said first electronic message, said first electronic message thereafter sent from said first computer to said central network computer by means of a network link from said merchant, institutional or other computer or web server to said central network computer.

14. The method as claimed in claim 1 including, upon receiving said first electronic message said central network computer transmitting a confirmation request to the originator of said first electronic message, upon receiving said confirmation request said originator of said first electronic message transmitting a confirmation acknowledgment to said central network computer.

15. The method as claimed in claim 1 wherein the originator of said first electronic message further transmits to said central network computer rating information with respect to the performance of the individuals, businesses or other entities with whom the originator of said first electronic message exchanges information or conducts financial or other transactions over said public or quasi-public network.

16. The method as claimed in claim 15 wherein said rating information is collected and then stored on said central network computer and made available to individuals, businesses or other entities over said public or quasi-public network.

* * * * *